US009858326B2

(12) United States Patent
Yan et al.

(10) Patent No.: US 9,858,326 B2
(45) Date of Patent: Jan. 2, 2018

(54) DISTRIBUTED DATA WAREHOUSE

(71) Applicant: MICROSOFT CORPORATION, Redmond, WA (US)

(72) Inventors: An Yan, Sammamish, WA (US); Mingyang Zhao, Issaquah, WA (US); Robert C. Wang, Redmond, WA (US); Yu Chen, Sammamish, WA (US); Blake Anderson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/648,812

(22) Filed: Oct. 10, 2012

(65) Prior Publication Data
US 2014/0101201 A1 Apr. 10, 2014

(51) Int. Cl.
*G06F 17/30* (2006.01)

(52) U.S. Cl.
CPC .. *G06F 17/30592* (2013.01); *G06F 17/30557* (2013.01)

(58) Field of Classification Search
USPC ....... 707/776, 747, 769, 723, 752, 706, 748, 707/741
See application file for complete search history.

(56) References Cited

U.S. PATENT DOCUMENTS

| | | | |
|---|---|---|---|
| 6,480,836 B1 * | 11/2002 | Colby et al. | 707/717 |
| 6,839,711 B1 * | 1/2005 | Reddy et al. | 707/802 |
| 6,983,291 B1 * | 1/2006 | Cochrane | G06F 17/30489 707/625 |
| 7,133,876 B2 * | 11/2006 | Roussopoulos et al. | 707/752 |
| 7,324,991 B1 * | 1/2008 | Anjur | G06F 17/30536 |
| 7,716,167 B2 * | 5/2010 | Colossi et al. | 707/714 |
| 7,792,856 B2 * | 9/2010 | Fuxman et al. | 707/769 |
| 7,979,436 B2 * | 7/2011 | Fuxman et al. | 707/737 |

(Continued)

OTHER PUBLICATIONS

Sakr, et al.,"A Survey of Large Scale Data Management Approaches in Cloud Environments", In Proceedings of IEEE Communications Surveys & Tutorials, vol. 13, No. 3, Apr. 5, 2011, 26 pages.

(Continued)

*Primary Examiner* — Jeffrey A Burke
*Assistant Examiner* — Thong Vu
(74) *Attorney, Agent, or Firm* — Shook, Hardy & Bacon, L.L.P.

(57) ABSTRACT

Methods and data structures are provided for allowing data mining with improved efficiency. During processing of a usage log (or multiple logs) for an activity, such as a usage logfile of network search activity, a common fact table is generated. The common fact table allows a plurality of auxiliary data structures to be formed from the common fact table. These auxiliary data structures are designed to allow users to submit queries against the contents of the data structure in order to investigate the data. The efficiency of access of the common fact table is improved by allowing users to access auxiliary data structures other than the auxiliary data structures that are associated with a user. Optionally, the common fact table and/or the auxiliary data structures can include dimension values that correspond to both pre-identified dimension values as well as dimension values that are identified during processing of the activity logfiles.

26 Claims, 7 Drawing Sheets

(56) References Cited

U.S. PATENT DOCUMENTS

| | | | |
|---|---|---|---|
| 8,108,401 B2* | 1/2012 | Qiao | G06F 17/30489 707/747 |
| 8,171,030 B2* | 5/2012 | Pereira et al. | 707/741 |
| 2002/0099691 A1* | 7/2002 | Lore | G06F 17/30324 |
| 2003/0055832 A1* | 3/2003 | Roccaforte | G06F 17/30592 |
| 2003/0171876 A1* | 9/2003 | Markowitz et al. | 702/20 |
| 2004/0243593 A1* | 12/2004 | Stolte | G06F 17/30592 |
| 2008/0313140 A1* | 12/2008 | Pereira et al. | 707/2 |
| 2009/0006331 A1* | 1/2009 | Fuxman | G06F 17/30592 |
| 2009/0018996 A1 | 1/2009 | Hunt et al. | |
| 2010/0198778 A1 | 8/2010 | Venugopal et al. | |
| 2010/0318527 A1* | 12/2010 | Nandy | G06F 3/0484 707/754 |
| 2011/0125704 A1 | 5/2011 | Mordvinova et al. | |
| 2011/0264636 A1 | 10/2011 | Chowdhary et al. | |
| 2012/0054249 A1 | 3/2012 | Batra et al. | |
| 2013/0151491 A1* | 6/2013 | Gislason | G06F 17/30339 707/696 |
| 2013/0275364 A1* | 10/2013 | Wang et al. | 707/602 |
| 2013/0275365 A1* | 10/2013 | Wang | G06F 17/30592 707/602 |

OTHER PUBLICATIONS

Zeunert, Don,"Customizing OMEGAMON XE for Maximum Benefit and Minimal Overhead Part 3: OMEGAMON XE for CICS V100 and CICSplex V220", Retrieved on: Jul. 13, 2012, Available at: https://www-01.ibm.com/software/tivoli/features/ccr2/ccr2-2004-04/techtip-customizing.html.

* cited by examiner

DISTRIBUTED DATA WAREHOUSE

BACKGROUND

The continued increase in the numbers and types of computing platforms has contributed to a corresponding gain in the amount of data available for analysis. The change in the amount of available data is driven by both an increase in the number of events that can be effectively captured as well as increases in the types of data that can be easily stored for a given event. Keyword searching for information on a wide area network provides one example of how the amount of available data for analysis has changed. In recent years, the number of people performing searches has increased, the types of information being searched for has increased, and providers of search engines have become increasingly sophisticated in identifying information that is valuable for data mining. Many other types of on-line and/or business activities have seen similar growth in available information.

SUMMARY

In various embodiments, methods and data structures are provided for allowing data mining with improved efficiency. During processing of a usage log (or multiple logs) for an activity, such as a usage logfile of network search activity, a common fact table is generated. The common fact table allows a plurality of auxiliary data structures to be formed from the common fact table. These auxiliary data structures are designed to allow users to submit queries against the contents of the data structure in order to investigate the data. Use of a common fact table for forming auxiliary data structures allows multiple users to further investigate the underlying data from the usage log while maintaining consistency in the auxiliary data structures used by the multiple users. The efficiency of access of the common fact table is improved by allowing users to access auxiliary data structures other than the auxiliary data structures that are associated with a user. Optionally, the common fact table and/or the auxiliary data structures can include dimension values that correspond to both pre-identified dimension values as well as dimension values that are identified during processing of the activity logfiles.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
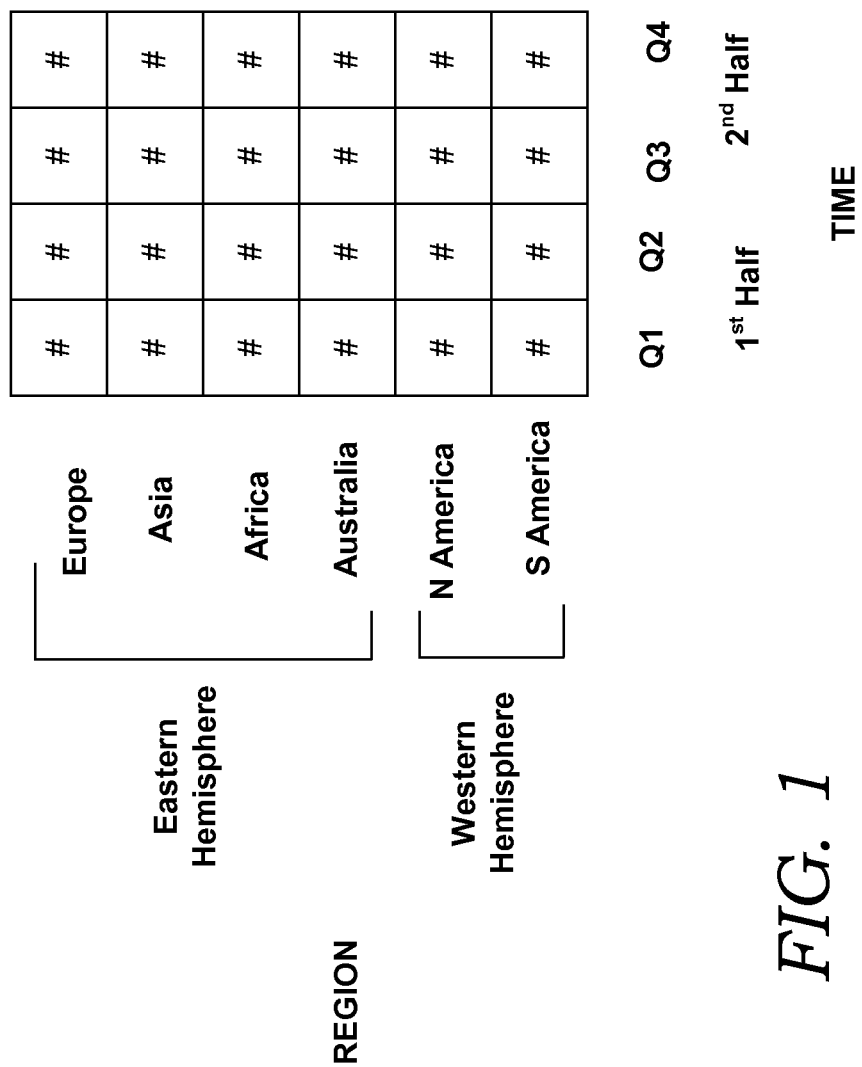
FIG. 1 shows a limited example of an auxiliary data structure that includes only two dimensions.

In various embodiments, systems and methods are provided for allowing users to access data from large data sets in an efficient manner. The systems and methods include an improved storage methodology that allows a plurality of users (such as all users) that access data from a given initial data source (or group of data sources) to use a common fact table while still maintaining acceptable access speeds. This is achieved in part by using a distributed storage environment to store supporting dimensional information for the common fact table. The improved storage methodology is also achieved in part by storing only dimension keys as part of the common fact table, as opposed to storing full dimension tables in the same storage area as the common fact table.

The common fact table is constructed in part by aggregating information for desired measures and/or dimensions from a variety of users that desire to use information from a common source. Aggregating the desired measures and/or dimensions for a plurality of users allows all of such measures and dimensions to be considered during data extraction from a data source. As a result, a data source can be traversed a single time while extracting all of the necessary information for the users. Additionally, aggregating the desired measures and/or dimensions for a plurality of users allows a metadata database to be constructed. The metadata database provides a description of the measure and dimension combinations that have been requested by any user for use in an auxiliary data structure. When a first user makes a request for a new combination of at least one measure and at least one dimension, the metadata database can be used to identify whether the requested combination of measure and dimension has been already processed in any auxiliary data structure. Even though the desired combination of measure and dimension may be in an auxiliary data structure associated with a second user (and not associated with the first user), by allowing the existence of such a combination to be quickly identified, the first user can use the auxiliary data structure of the second user that contains the desired combination without having to construct a new auxiliary data structure. This can enhance the response time of the data mining system for handling the request from the first user.

Using a common fact table also allows multiple auxiliary data structures for handling user queries related to an initial data source to be constructed from the common fact table. In some embodiments, at least one group or list of fact or measure data incorporated into a first auxiliary data structure will be different from any of the groups of fact or measure data incorporated into a second auxiliary data structure, where both the first and second auxiliary data structures are formed from a common fact table. Additionally, at least one fact or measure group in the second auxiliary data structure can be different from any of the groups of facts or measures in the first auxiliary data structure. In other embodiments, all groupings of fact or measure data incorporated into a first auxiliary data structure may be different from the groupings of fact or measure data in a second auxiliary data structure, where both the first and second user data structures are formed from a common fact table.

In addition to the above, in various embodiments systems and methods are provided that allow for improved error handling during construction and use of a common fact table, an auxiliary data structure, or combinations thereof. One of the difficulties in using a common fact table is handling the large volume of data associated with some initial data sources. For example, the daily usage logs for a general purpose web site, such as a search engine or a commerce site, can correspond to tens of terabytes of data. Due to the potentially large volume of data, it is desirable to process such logfiles while reducing or minimizing the amount of intervention required by an operator.

In various embodiments, one way that the need for intervention is reduced by providing rules for auto-discovery of dimension members. During analysis of usage logs, a variety of dimension values are extracted from the logs. Ideally, the dimension values extracted from the usage logs would correspond only to valid values. In practice, however, unexpected information can be extracted and stored in a position that should correspond to a dimension value. Conventionally, the extraction of an unexpected value as a dimension value can result in one of two types of errors. One type of error is that the extraction of information from the usage log is stopped, and a user or operator is notified. This outcome is undesirable, as human intervention is required during processing of the logs. The other conventional solution is to continue with processing of the usage logs and then subsequent creation of any auxiliary tables that are used by users for data analysis. Unfortunately, this also creates difficulties, as the auxiliary tables will not be constructed correctly, requiring reprocessing of the auxiliary tables when the error is finally detected.

To overcome the above difficulties with unexpected dimension values, various embodiments allow for automatic discovery of dimension values. During automatic discovery of dimension values, when an unexpected dimension value is found, the unexpected value is compared with up to two types of rule sets for automatically discovered dimensions. A first type of rule set provides rules for determining whether a dimension value is valid, even though it is not a pre-identified dimension value. A second type of rule set checks the number of existing dimension values for a given dimension against a limit, to verify that the total number of dimensions is reasonable. If the automatically discovered dimension value satisfies both rule sets, the dimension value is treated as valid and used for future data analysis. Such a dimension value can be referred to as an unmanaged dimension value. This can allow, for example, a new store location to be identified as a valid "location" dimension value based on the new store location having the correct dimension value format.

Data Mining from Large Data Sources

Logs of usage or activity are now routinely collected for a wide variety of events that occur on or are otherwise facilitated by the use of a computer. Logfiles recording usage such as search queries, search results, and/or user interactions with search results provide examples of the types of activities that can be recorded in a search environment. Online commerce transactions can similarly be tracked and logged to gather information. Capturing such events can provide a wealth of information for extraction via data mining.

One type of data storage structure for storing data for future use is to use a format involving measures and dimensions. A measure corresponds to a group or listing of basic items of information related to events, such as sale prices for items for a group of sales, a number of times a query term is included in a query for a group of queries, a number of times two query terms appear together for a group of queries, or dates for a group of events. Many types of measures can be aggregated, such as by adding numerical measure values or by counting the number of occurrences of a measure. Dimensions correspond to additional attributes that further describe the events a measure is based on, such as attributes that can be used to aggregate measures in various ways. Examples of dimensions can be the store location for a purchase, user demographic information regarding context for submitted query, or other types of information. In many situations, the potential valid values for a dimension will correspond to a finite set of dimension values.

It is noted that one factor in selecting the types of measures used in a data storage structure is the level of granularity desired for the data storage structure. As an example, the design of a data storage structure for query information can be considered. One option would be to store sufficient information in the data storage structure so that every query submitted anywhere would be considered a separate data item. This would correspond to the finest level of granularity, and would provide the maximum possible amount of ways that data could be organized. However, such a fine level of granularity would also likely reduce response times to queries, as search logs can correspond to multiple terabytes of data for a commercial search engine. At such a fine level of granularity, little data compression would occur, meaning that roughly terabytes of data would need to be scanned in order to provide answers to various user inquiries. This would slow down response time.

Another option is to use a higher level of granularity, such as by counting only the number of occurrences of a query term by region, or by user demographic group, or based on another context variable, or even by separately counting in occurrences based on a plurality of such context variables. If this level of granularity is sufficient to satisfy user inquiries, storing values at a higher level of granularity can reduce the amount of time required for accessing data. This can be valuable in a context such as a search query analysis, where a large number of separate types of facts may be of interest. For example, in addition to counting the occurrences of a given query term, it may also be of interest to count occurrences of a first query term in conjunction with a second query term. For this type of situation, it may be more efficient to treat the pair of the first and second query term as a query phrase, where occurrences of the query phrase are separately tracked, along with possibly tracking the order of occurrence of the two terms when they appear in common, whether they are used as the only two query terms or as part of a longer query.

Storing information as measures with associated dimensions is useful for allowing users to efficiently retrieve both individual measure values as well as various aggregated values based on the measures. As noted above, the number of basic measures can quickly grow when analyzing an activity log, such as a search activity log. The number of dimensions used to characterize those basic measures can also grow quickly when additional dimensions are added.

As an example, consider a data set for a number of widgets sold worldwide over a time period. In this example, the basic measure is the number of widgets sold. One dimension corresponds to a Region dimension. The overall Region corresponds to all worldwide sales. A first subdivision of worldwide sales is sales for the Eastern Hemisphere versus the Western Hemisphere. In the Eastern Hemisphere, the dimension includes 4 members: Europe, Asia, Africa, and Australia. The Western Hemisphere includes two additional dimension members of North America and South America. This represents the lowest level of granularity for the Region dimension. A second dimension corresponds to a Time dimension, which includes four members corresponding to the $1^{st}$, $2^{nd}$, $3^{rd}$, and $4^{th}$ fiscal quarters for the widget maker. Optionally, an intermediate subdivision corresponding to the $1^{st}$ and $2^{nd}$ fiscal halves of the year can be used to group the quarters.

FIG. 1 shows an example of a 2-dimensional data warehouse structure for storing the widget sales numbers, as organized by the "dimensions" of Region and Time. As shown in FIG. 1, the members of the dimensions often correspond to some type of row or column heading for organizing facts or measures, while the fact or measure values represent the data contained within the various rows or columns. Based on the specified dimensions, the lowest level of granularity required is to be able to characterize sales events based on six distinct regions and four distinct time periods, as shown in FIG. 1. Thus, this data warehouse structure requires storage of at least 24 distinct values. It is noted that a still lower level of granularity could be used for storing information regarding sales events, leading to a higher number of distinct stored values; however, such a finer level of granularity is not required for only the dimensions specified in this simple example.

FIG. 1 shows an example of a data storage structure with only 2 "dimensions" for classifying the data. As a further example of how additional dimensions can quickly increase the amount of required data storage, a third dimension of Transport could be added to the data structure in FIG. 1. The Transport dimension includes four members, corresponding to air, sea, truck, and train. Because the Transport dimension includes four members, the minimum number of required storage values has been increased to 24×4=96 members.

Based on the above simple examples, the problems with storing data for usage logfiles containing large numbers of events for disparate groups of users becomes apparent. Each user can potentially be interested in different types of basic facts or measures in the event logfiles. Each user can also be interested in different types of dimensions for the same facts. Under a conventional storage scheme, all of the information for measures and supporting dimensions is stored in a single data warehouse structure. When the amount of information required to support such a data warehouse structure reaches terabytes of data, such a structure is not useful, as response times for the data structure are slower than desired.

In order to overcome the difficulties of a single data warehouse structure containing both measures/facts and supporting dimensional data, several conventional solutions have been proposed. One option for large data sets is to have each user separately process desired event logfiles to extract just the information desired for that user. This strategy results in data warehouse structures that are tuned in size to the information needs of a given user. However, the initial processing of the event logfiles is costly in terms of computer resources, making this type of solution inefficient. Additionally, having each user separately process the raw logfiles creates the potential for inconsistent data sets when attempting to compare data between users.

Another conventional solution is to avoid having a unified data warehouse, and instead capturing the facts or measures from event logfiles in a plurality of fact tables. These fact tables may have their own dimension structures, or dimension structures can be shared with other fact tables. This allows for common processing of the event logfiles, but still can result in inconsistencies in the data across fact tables. Additionally, not all dimensions may be available for all types of facts or measures.

Common Fact Table with Abstracted Storage of Dimensions

In order to overcome the shortcomings of conventional data storage schemes when handling large data sets for data mining, a new storage method is provided herein that allows for desired response times to user data queries while reducing or minimizing difficulties due to users having access to inconsistent data. In various embodiments, event or usage logfiles for a data type are processed to form a common fact table. During processing of the usage logfiles, all dimensions of potential interest to users are processed along with the common fact table. Preferably, all dimensions are available for any measure or fact in the common fact table. However, a distributed storage scheme is used so that the common fact table is stored separately from dimension information. Instead of storing dimension information with the common fact table, the storage for the common fact table only stores dimension keys, or references to where to access the dimension information. The dimension tables (or other storage structure for dimension information) are stored in a separate logical and/or physical storage device within a distributed computing environment.

By abstracting out the storage of the full dimensions, the advantages of a common fact table can be realized while reducing or minimizing the impact on performance due to the large amount of data being handled. In particular, using a common fact table reduces the likelihood of multiple users receiving inconsistent facts or measures.

Based on the common fact table, various users can request data sets that provide the measures or facts and associated dimensions desired for a particular type of analysis. Because the common fact table includes a dimension key for all potential dimensions, any available dimension can be requested by any user. The appropriate portions of the fact table, along with requested dimensions, can be used to construct a data structure for processing data queries by a user.

By constructing a common fact table, more types of facts or measures will be available then will be used by a typical user. As a result, when a plurality of users request different data structures, in many embodiments there will be at least one fact or measure included in a first auxiliary data structure that is not included in a second auxiliary data structure. In some situations, a first auxiliary data structure may not have any facts or measures in common with a second auxiliary data structure. Similarly, the dimensions requested by different users may differ by at least one dimension, by one or more dimensions, or even all dimensions may be different.

Aggregation of User Definitions and Metadata

Because multiple users may desire to use a common fact table for a variety of types of data inquiries related to a single data source (or group of related data sources), a methodology is needed so that the common fact table can include all of the facts/measures and dimensions desired by the various users. One method for doing this can be to accumulate the definitions for desired user data structures from the various users in a centralized data location. The definitions for the desired user data structures can include user data structures defined by the system, defined by a user, or defined in any other convenient manner. For example, consider a conventional situation where multiple users perform data mining on a group of usage logs related to search activity. In this example, one or more auxiliary data structures for allowing data queries based on the usage logs are defined by the system. Additionally, a plurality of the users can also have definitions for additional auxiliary data structures that are specific to individual users (or less than all of the multiple users who perform data mining). In such an example, all of the user data structure definitions can be aggregated in a database, such as a metrics metadata database. By accumulating the user data structure definitions in a metrics metadata database, scripts can be generated that will include all needed fact/measure groupings and all dimensions necessary to provide a common fact table to serve the multiple users that perform data queries against the information from the search usage logs.

In order to generate a common fact table based on the above aggregated definitions, a couple of additional structures can be helpful. One additional structure is a master data services database for storing information related to dimensions and dimension membership. The master data services database can include lists of allowed dimension members for dimensions that contain a pre-defined group of members. Additionally, for dimensions that include members that are not pre-defined and/or dimensions that only contain members that are not pre-defined, validation rules can be included for checking whether a potential dimension value is suitable for use as a member of a dimension. The validation rules can also include limits on the number of dimension members that are allowed to exist for a given dimension.

Another potential structure is a script generation component. For example, one potential embodiment for the group of accumulated definitions for auxiliary data structures is that the definitions describe various data tables within a data set, where the data tables correspond to a common fact table and one or more supporting dimension tables. A script generation component can convert these definitions into a script for processing information from usage logs to form the data tables within a data set.

Preferably, the common fact table and supporting dimension tables can be formed using a distributed computing environment. This can allow for more efficient processing of the usage logs as well as distributed storage of the common fact table and supporting dimension tables.

The common fact table and supporting dimension tables could be used to directly handle user requests related to data analysis. However, due to the potential volume of data in a common fact table (and supporting dimension tables), direct use of the common fact table for providing answers to a user query does not provide desirable performance. One way to improve performance in responding to user data analysis requests is to construct one or more auxiliary data structures. Auxiliary data structures represent smaller groupings of facts and dimensions that correspond to known groupings of interest. Preferably, these definitions correspond at least in part to the definitions used for initially constructing the common fact table. Based on system definitions and/or user definitions of desired fact and dimension combinations, auxiliary data structures can be generated based on the expected needs for a user. This provides users with more manageable data tables that correspond to the measures and dimensions a user has identified as being of interest. As a result, the response time to a user query based on facts and dimensions in an auxiliary data structure is expected to be faster than handling such a query by returning to the common fact table.

Because all of the auxiliary data structures are formed from a common fact table, the formation of auxiliary data structures can also be tracked in the metrics metadata database. As a result, the existing combinations of facts and dimensions within any auxiliary data structure can be stored. When a user requests a fact and dimension combination that is not in the auxiliary data structure(s) normally accessed by the user, the metrics metadata database can be consulted to see if any auxiliary data structure has the desired combination. If another auxiliary data structure contains the desired combination, the user request can be handled based on the existing auxiliary data structure instead of having to return to the common fact table. This provides an improvement in response time for at least some unexpected data queries by a given user.

Structures for Implementing Common Fact Table

Figure 2:
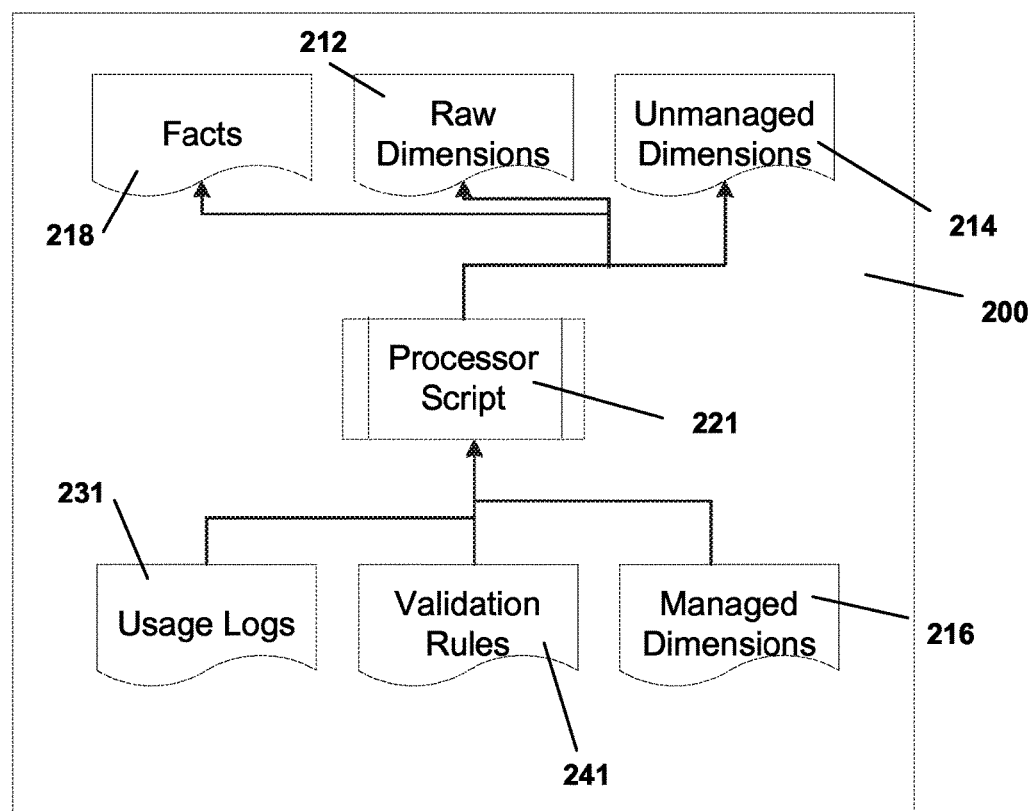
FIG. 2 schematically shows an example of a system for creating a common fact table and auxiliary data structures.

FIG. 2 schematically shows the relationships between various aspects of a system for performing data queries on data mined from activity logs and stored using a common fact table scheme according to the invention. In FIG. 2, data processing structure 200 shows the relationship between various types of information that are used to generate a common fact table. Usage logs 231 correspond to one or more event logs that represent the raw data that is processed in order to transform the raw data into a form suitable for performing data analysis or other data mining operations. This raw data is consumed by a process that operates under the control of a dimension building or generation feature, such as a processing script 221. The dimension building or processing script 221 controls the processing of the raw data from usage logs 231, so that data is aggregated into the desired facts and supporting dimension values.

The values extracted from the usage logs 231 are influenced by the dimension validation rules 241. In various embodiments, the validation rules 241 for processing event or usage logs 231 can be provided from a database containing rules for forming a desired type of common fact table. The validation rules 241 can vary depending on the type of common fact table (and associated dimension tables), the source of the usage logs that are processed to form the common fact table, and/or the type of usage logs that are processed to form the common fact table. The validation rules 241 can be included as part of the definitions for fact and dimension combinations obtained from various users, or the validation rules can be provided separately.

Members of a dimension that are identified in advance can be referred to as a "managed" dimension values. For example, a regional or geographic dimension may be limited to having a defined set of values, such as "Central US" or "Western Europe". Optionally, for some dimensions it may be desirable to exclude any values other than the originally identified values. For such dimensions, if a dimension value other than a pre-identified value is detected, the unexpected dimension value is treated as an error.

Preferably, one or more dimensions can be open-ended dimensions or can otherwise allow for automatic discovery/handling of unexpected or new dimension values. Such automatically discovered dimension values can be referred to as unmanaged dimensions. For an unmanaged dimension value, one or more validation rules can be used to verify that the value is a suitable or proper value for a dimension. Some validation rules can correspond to formatting rules or other rules where a characteristic of the new or unexpected dimension value can be compared with a rule as a validity check. For example, for a dimension involving a date in month-year format, a first validation rule can require the format of a dimension value to be <number; "−"; number>. A second validation rule can require that the first number and second number have values that are meaningful as data values, such as a number between 1-12 (inclusive) for a month, or a four digit number of a year. An example of a dimension value that satisfies the rule is "8-2012." Thus, in the example of a dimension involving date in month-year format, any potential dimension value where the number before the dash is greater than 12 can be excluded as not being a proper value for the date dimension. More generally, any other convenient type of error checking or pattern matching can alternatively be used to verify whether a given value is a suitable or appropriate value for an unmanaged dimension.

Another type of validation rule can correspond to a limit on the number of permitted dimension values and/or a limit on the number of occurrences of an unmanaged dimension. For example, during processing of a usage log, a formatting error could occur during some type of pre-processing for a log, resulting in a character shift. If this occurred, a substantial number of the dimension values from a logfile might be unexpected. Depending on the nature of the error, there could be many instances of a few unexpected values, or there could be a large number of different unexpected values. In either situation, although such dimensions could be automatically discovered and handled as unmanaged dimensions, a more desirable outcome would be to notify a user or operator that something unusual has occurred during processing. For this type of situation, validation rules can be used to check the number of new unmanaged dimensions that are encountered during processing. If a large number (such as greater than a threshold value) of unmanaged dimensions are found relative to normal processing behavior, an error can be generated and processing stopped so that a more detailed investigation can be performed. Similarly, if a large number (such as greater than a threshold value) of entries in a usage log are associated with one or more unmanaged dimensions, this can be recognized as an error and a user or operator can be notified. Still another option is to have a series of thresholds for both number of dimension values and number of facts associated with unmanaged dimensions, so that a variety of threshold combinations can trigger an error related to excessive unmanaged dimensions.

Figure 7:
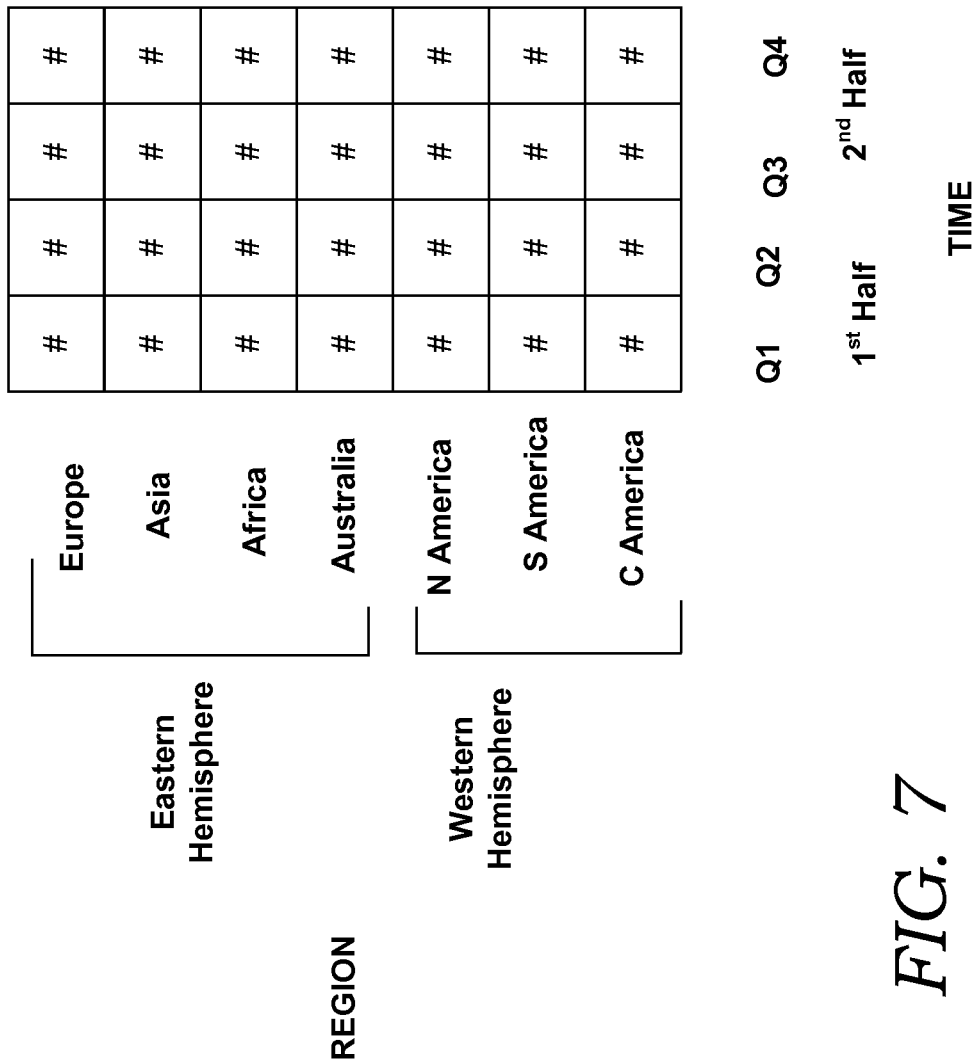
FIG. 7 shows another limited example of an auxiliary data structure that includes only two dimensions.

FIG. 7 provides another example of an automatically discovered dimension. In an example similar to the auxiliary data structure shown in FIG. 1, a dimension of "Region" has 6 pre-defined dimension values. In this example, unmanaged dimension values are also permitted. For an unmanaged dimension value, a first validation rule specifies that the format of a "Region" dimension value must be <character; ":"; character_string>, wherein character is single character that is either an e, E, w, or W (for Eastern or Western hemisphere), and character_string is a string of less than 15 characters corresponding to the name of the Region. A second validation rule specifies that the total number of all dimensions is 10 or less, and the number of instances of an unmanaged dimension is less than 150.

During processing of a usage logfile, a dimension value for Region is extracted of "W:C_America", which corresponds to a Central America region in the Western Hemisphere. The unmanaged dimension value is compared with the first validation rule. The initial character satisfies the requirements of being a single character corresponding to W. The colon is present as the next portion of the dimension value. The final character string satisfies the requirement of being less than 15 characters. Thus, the extracted unmanaged dimension value satisfies the first validation rule. For the second validation rule, the number of managed dimension values is 6, so the addition of Central America raises the total to 7. This satisfies the 10 or less requirement. Additionally, as processing of the usage log continues, only 4 instances of the Central America region value are found, which satisfies the requirement of having less than 150 instances of the unmanaged Central America value. Thus, this newly discovered dimension value of Central America in the usage logfile satisfies the validation rules for the Region dimension, and therefore is accepted as a dimension value. When the auxiliary data table shown in FIG. 1 is processed the next time, an additional row is added to show the automatically discovered dimension.

Returning to FIG. 2, once the validation rules 241 are provided and the dimension script 221 is formed, the raw data in usage logs 231 can be processed to extract and/or aggregate data to determine facts 218 and raw dimension values 212. In FIG. 2, acquiring the facts 218 and raw dimension values 212 includes extraction and/or aggregation of corresponding measure or fact values. Some raw dimension values will match the list of managed dimension values 216. The remaining unrecognized raw dimension values can be matched against validation rules 241 to determine if the unrecognized raw dimension values qualify as unmanaged dimensions values 214. The unmanaged dimension values 214 that match validation rules can be added to the list of suitable dimension values for a corresponding dimension. Tracking the number of raw dimension values 212 and/or unmanaged dimension values 214 can also be valuable as an error checking tool, as an excessive number of raw dimension values 212 and/or unmanaged dimension values 214 may indicate a problem during data processing. After extraction and/or aggregation, the fact values 218, managed dimension values 216, and unmanaged dimension values 214 are ready for incorporation into a common fact table and corresponding dimension storage tables located in distributed storage. For the dimension keys that will be included in the fact table, the dimension keys can be looked up in either the managed dimension value storage 216 or unmanaged dimension value storage 214, or the dimension keys can be computed as hash keys during generation of the common fact table.

As an illustrative example, a variety of concepts can be used for building a common fact table and then constructing auxiliary data structures corresponding to measures from the common fact table along various available dimensions.

A "data set" is a container for a collection of data tables, such as one or more data tables corresponding to fact tables and/or dimension tables. The data tables in a data set are in contrast to the auxiliary data structures that are queries by users in order to analyze the data. It also contains a collection of data sources that are referred by the data tables owned by the data set. In various embodiments, a data set according to the invention will contain no more than 1 fact table in the form of a common fact table. The data set can also contain one or more data tables that include dimension information. In this description, a data source specifies the source location of data for a data table, such as one or more event, activity, or other usage logs. A data source can also be associated with a namespace that further identifies the data source. For example, logfile data captured from a toolbar of a browser could be associated with a "toolbar" namespace, while logfile data captured based on entries into a search query box could be associated with a "search" namespace.

As noted above, a data set corresponds to one or more data tables. A "data table" is a container for a collection of data columns to specify the table schema. A "data column" specifies the name and data type of a column in a data table. It contains a link to a dimension object if it is to be used as a dimension, or a link to a measure/fact object if it is to be used for storing measure or fact values. In various embodiments, only a common fact table will include data columns with links to measure objects, as all facts are stored within the common fact table. Additionally, a common fact table will typically include only one data column per dimension. This data column per dimension allows the common fact table to store the dimension key for the corresponding dimension. All remaining dimension columns for a dimension are stored in other tables at distributed locations. A data table can also include an associated specification of a data table data source. A data table data source specifies the many-to-many relationships between data tables and data sources. A data table can have multiple data sources and a data source could be referred by multiple data tables, such as a common fact table and one or more additional tables containing data columns for various dimensions.

A data column also contains a collection of zero or more (such as one or more) data column dependency objects to describe its relationship with other data columns. A data column dependency object specifies the dependency between data columns. In an embodiment, a data column dependency object can specify one of two types of dependencies: source and foreign key. The "source" dependency specifies the data source that a data column is derived from. The "foreign key" dependency specifies that the data column is a foreign key of a dimension table stored at another logical and/or physical location in the distributed storage.

A "dimension" object specifies the dimension name and (optionally) the namespace that the dimension belongs to. A dimension object can also contain references to a master data service (MDS) database if it is a managed dimension. In some embodiments, a master data service database can include various types of information regarding a dimension, including whether all dimension values for a dimension are known, and/or validation rules for determining whether a dimension value is suitable for a dimension. Additionally, a dimension object can contain a collection of data table objects that specify the dimension table for a dimension.

A "measure" object specifies the measure or fact name and the namespace for the data source that the measure belongs to. The measure object can also specify additional characteristics. For example, for a measure based on a usage log related to search activity, the measure object can include one or more attributes to specify a measurement type, a page region and page data services for the corresponding search usage log that is the data source of the measure. A measure object can also contain a collection of measure dimension objects to describe the relationship of the measure object with other dimensions for aggregation of a measure.

A "measure dimension" object specifies if a dimension is allowed or required for the aggregation of a measure. If the dependency is "allowable", it means the dimension can be used, if desired, for the aggregation of a measure. If the dependency is "mandatory", it means that use of the dimension is required for aggregation of the measure.

The above types of objects may not capture every type of information that is desired as part of a common fact table or in an associated dimension. To capture any additional desired information, one or more "property" objects can also be defined. A property object specifies the name value pair of an arbitrary property. It can be used by a data set, a data source, a data table, a data column, a dimension object, and/or a measure object to contain additional attributes which are not otherwise specified.

In order to control access to various objects, a "permission" object can be used. A permission object specifies the role that is given to a user or user group to access or modify an object. A permission object can be used by a data set, a data source, a data table, a data column, a dimension object, or a measure object for security and permission control.

EXAMPLE 1

Constructing and Using a Common Fact Table for Data Mining

The following example provides an overview of the various processes and systems for starting with usage logfiles and finishing with auxiliary data structures that allow a plurality of users to perform different types of data queries based on the processed contents of those usage logfiles. The example is for illustration purposes only, and is not intended to limit the scope of the invention. In the following example, for some types of measures, the measure data will be accumulated for a limited number of items, such as a measure corresponding to the 1000 query terms with the highest frequency of occurrence. The selection of 1000 query terms is arbitrary in this example, in order to illustrate the operation of the invention. In practical embodiments, the occurrences of millions (or more) query terms may be counted for use as a measure in a common fact table and/or supporting dimension tables.

A. Problem to be Solved for Example 1

In this example, a plurality of users are interested in analyzing or mining data from usage logfiles related to search activity. In this example, when a "user" is referred to, it is understood that the user can equally be a team of users with a common goal or function, such as a team of users focused on the health of a search system or a team of users interested in advertising behavior in results displayed in response to queries. It is also understood that a "user" can refer to an automated process initiated by a user, so that data mining an analysis is automatically performed on a scheduled basis and results provided for review by the user.

As an initial step, the contents to be included in a common fact table and the corresponding dimension tables need to be determined. The contents can be determined by aggregating the definitions of desired measures and supporting dimensions from a plurality of users that will perform data queries against the processed data from a group of user logs. Optionally, one or more additional sets of definitions could be obtained from another source, such as pre-determined definitions provided as a default. However, for simplicity in explanation, this example will focus on accumulating the user-generated definitions.

In this example, 4 different users (including teams of users and/or automated processes) are involved in analyzing data from search usage logs. The 4 users are an advertising user, a system health user, a content analysis user, and a new feature user. Tables 1 and 2 show the measures and dimensions of interest to the four types of users. The measures correspond to a) the number of instances of the 1000 most frequently used query terms; b) the number of instances of the 1000 most frequently used pairs of query terms; c) the number of instances of any term that appears in the 100 most frequently used location dependent queries; d) the number of occurrences of query terms from a defined list of terms; e) the number of occurrences of any queries that are classified as sensitive queries (such as adult queries) by the search engine; and f) the number of instances of terms of the 1000 most frequently used query terms that cause a results page to include links for at least one type of secondary content, such as image content, video content, or audio content. The dimensions correspond to 1) a user demographic context dimension; 2) a geographic context dimension; 3) an advertising dimension; 4) a request source dimension; 5) a query context dimension; 6) a result type dimension; and 7) a secondary content dimension. As shown in Tables 1 and 2, at least one measure and/or at least one dimension of interest is different between each user. In fact, for the advertising user and the system health user, none of the measures of interest are in common. A more complete description of Measures a-f and Dimensions 1-7 shown in Tables 1 and 2 is provided below.

TABLE 1

|  | User 1 (Ads) | User 2 (System Health) | User 3 (Content Analysis) | User 4 (New Features) |
|---|---|---|---|---|
| Measure a | X |  |  | X |
| Measure b | X |  |  | X |
| Measure c | X |  | X |  |
| Measure d |  | X |  |  |
| Measure e |  | X |  |  |
| Measure f |  |  | X | X |

As shown in Table 1, the advertising user is interested in analyzing search usage logfile data to determine how advertising displayed relative to search results is operating. Measures of interest to the advertising user are a) the number of instances of the 1000 most frequently used query terms, b) the number of instances of the 1000 most frequently used pairs of query terms, and c) the number of instances of any term that appears in the 100 most frequently used location dependent queries. In this example, it is assumed that the search engine has a definition for a location dependent query, such as a query containing particular types of terms (restaurant, weather, pizza, etc.) or a query having a particular score under and algorithm for determining if a query is location dependent.

TABLE 2

|  | User 1 (Ads) | User 2 (System Health) | User 3 (Content Analysis) | User 4 (New Features) |
|---|---|---|---|---|
| Dimension 1 | X | X | X |  |
| Dimension 2 | X |  | X | X |
| Dimension 3 | X |  |  |  |
| Dimension 4 | X |  |  | X |
| Dimension 5 |  | X | X |  |
| Dimension 6 |  | X |  |  |
| Dimension 7 |  |  | X | X |

As shown in Table 2, for the measures of interest to the advertising user, the advertising user is also interested in the dimensions of 1) a user demographic context dimension, 2) a geographic context dimension, 3) an advertising dimension, and 4) a request source dimension. A definition of the various dimensions will be provided below.

The system health user is interested in analyzing the behavior of the system over time, to verify that appropriate types of results are being provided in response to search queries. Measures of interest to the system health user are d) the number of occurrences of query terms from a defined list of terms, and e) the number of occurrences of any queries that are classified as sensitive queries (such as adult queries) by the search engine. For the measures of interest, the system health user is also interested in the dimensions of 1) a user demographic context dimension, 5) a query context dimension, and 6) a result type dimension.

The content analysis user is interested in analyzing the types of content being requested, and how the content requests vary geographically. Measures of interest to the content analysis user are c) the number of instances of any term that appears in the 100 most frequently used location dependent queries, and f) the number of instances of terms of the 1000 most frequently used query terms that cause a results page to include links for at least one type of secondary content, such as image content, video content, or audio content. For the measures of interest, the content analysis user is also interested in the dimensions of 1) a user demographic context dimension, 2) a geographic context dimension, 5) a query context dimension, and 7) a secondary content dimension.

The new feature user is interested in analyzing current queries and corresponding results with regard to determining new search features and/or ways to improve existing features. Measures of interest to the new feature user are a) the number of instances of the 1000 most frequently used query terms, b) the number of instances of the 1000 most frequently used pairs of query terms, and f) the number of instances of terms of the 1000 most frequently used query terms that cause a results page to include links for at least one type of secondary content, such as image content, video content, or audio content. For the measures of interest, the new feature user is also interested in the dimensions of 2) a geographic context dimension, 4) a request source dimension, and 6) a result type dimension.

With regard to definitions for the dimensions, the user demographic context dimension 1) includes the age group of a user, gender of a user, and whether the user is believed to be an actual user or an automated program. In this example, the system health user and content analysis user only requested the age group and gender. However, the advertising user also requested the real or automated program dimension value, so any user requesting the user demographic context dimension will receive all portions of the dimension.

The geographic context dimension 2) includes dimension members corresponding to any city with a population of greater than a minimum value of people, such as at least a population of 40,000. For users with a geographic location outside of such a population center, the closest qualifying population center within 25 miles is selected. If no qualifying population center is within 25 miles, a dummy location is selected so that the user is placed within the correct bin or grouping for the higher level geography categories. A first intermediate geography level corresponds to a state within the United States or a province within Canada that a user is located in. A second intermediate geography level groups the U.S. states and Canadian provinces into 8 regions, such as "US southwest" or "US Northeast and Eastern Canada".

The advertising dimension 3) includes a plurality of different dimension values. The basic types of values are whether an ad was requested (Boolean); whether an ad was served (Boolean); a category for the ad (such as auto, computer, food, retail); and a type for the ad (such as banner, overlay, video, sponsored link). This information is extracted from the usage logs for up to five requested advertisements that are requested by the results page in response to a query. Thus, there is an adrequested1 value, adrequested2 value, and so on.

The request source dimension 4) includes a plurality of different dimension values. The basic types of values are they type of device used to submit the search request (such as phone, laptop, tablet, desktop) and the type of network connection (such as wi-fi, wire, cellular network).

The query context dimension 5) includes a variety of additional information regarding a query. The dimensions include the number of query terms in a query containing a term or phrase; the position(s) of the query term(s) within the number of query terms; whether the query was a navigational query (Boolean); whether the query was location dependent (Boolean); and whether the query was reformulated in order to provide results (Boolean). In this example, query reformulation refers to things such as changing the query based on a likely misspelled term, based on similarity to a common query term, or other similar types of query reformulations.

The result type dimension 6) includes several features related to system health. The dimension includes whether a properly working results page was returned in response to a query (Boolean); whether a navigational query returned a link to the expected navigational destination as the first result (Boolean); whether any sensitive (such as adult) content was returned as a responsive result (Boolean); and whether the first result returned to a query is the same as a result returned the previous day, if that information is available (Boolean).

The secondary content dimension 7) has dimension values specifying whether a page containing secondary content includes video, image, or audio content. If desired, this dimension could be formulated as a series of Boolean values.

Based on the above, it is clear the 4 different users (or types of users) have different interests, including a desire to perform data mining on disparate measure values, even though a single group of data sources provides the measure values.

B. Generating Common Fact Table and Associated Dimensions

Based on the desired analysis that each user intends to perform, each user has prepared definitions corresponding to the above measures and dimensions. Those definitions are accumulated in a database and used to prepare one or more scripts for constructing a common fact table and corresponding dimension tables. The scripts take the definitions provided by the users and generate a common fact table including all of the measures defined by the users based on the search usage logs.

After generating the appropriate scripts, the search usage logs are processed to generate the common fact table. Additionally, the search usage logs are processed to attempt to populate each dimension for each type of measure in the common fact table. Where appropriate data is not available, the dimension is assigned a null value. Because a common fact table is being generated, all of the users that desire to perform data mining on the search usage logs are able to form auxiliary data structures from the same common fact table without having to separately process the search usage logs.

As the common fact table and associated dimension tables are constructed, the storage of the tables is distributed so that the size of the table is constrained based on the user definitions, and not based on another system requirement. In order to accommodate this, the dimension tables are not stored in the same logical and/or physical location as the common fact table. Instead, the storage for the common fact table includes only the dimension keys for the various dimensions. The dimension tables are then stored at one or more other convenient logical and/or physical locations in the distributed computing environment. This allows the common fact table to maintain a lower size while still allowing a plurality of auxiliary data structures with different measure groups (such as measure columns) to be formed from a single common fact table.

C. Forming and Using Auxiliary Data Structures

After processing the search usage logs to generate the common fact table and associated dimension tables, the common fact table can be used to generate auxiliary data structures to match the needs of the various users. The auxiliary data structures generated from the common fact table match the measure and dimension designations noted in Tables 1 and 2 for each user. Thus, a first auxiliary data structure is generated for the advertising user (or user group) that includes measures a-c and dimensions 1-4. Similarly, auxiliary data structures are also generated that include measures d-e and dimensions 1, 5, and 6; measures c and f and dimensions 1, 2, 5, and 7; and measures a, b, and f and dimensions 2, 4, and 7. When the four different auxiliary data structures in this example are compared with each other, each auxiliary data structure includes at least one measure and/or at least one dimension different from another auxiliary data structure. Of course, it is also possible to form auxiliary data structures that include the same measures and/or the same dimensions.

After forming the auxiliary data structures, the various users can form queries for information based on the contents of the corresponding data structure. For queries that correspond only to measures and dimensions that were originally part of a user's definitions, the query can be processed against the corresponding auxiliary data structure.

In some situations, a user may desire to form a data query containing information beyond the initial definitions for that user. There are a variety of options for handling such a data query. Preferably, the metadata from the auxiliary fact tables constructed from the common fact table can be compared with the user request to determine whether the data query corresponds to a fact and dimension definition provided by another user. If a second user has already requested the fact and dimension combination requested by the first user, the first user's request can be processed by consulting the auxiliary data table defined by the second user.

If the data query corresponds to a combination of measures and dimensions not present in an existing auxiliary data structure, but the measures and dimensions are within the common fact table, a new auxiliary data structure can be formed from the common fact table that includes the necessary measures and/or dimensions to process the data query from the user. Alternatively, additional definitions can be uploaded by the user for aggregation in the database containing the various user definitions. The next time the common fact table is updated, the revised definitions can be used to expand or modify the common fact table to include any new measures or dimensions. When an auxiliary data structure is built for the user based on the updated common fact table, the additional measures and/or dimensions desired by the user can be included in the auxiliary data structure.

EXAMPLE 2

Strategies for Creating Common Fact Tables

As the number of users increases, or as the number of requested measures and/or dimensions increases, an increasing amount of time can be required to create a common fact table used for forming various auxiliary data structures. In some embodiments, some auxiliary data structures may have a higher priority for update than other auxiliary data structures. For example, in the hypothetical example described above, the advertising team, content analysis team, and new feature teams may be satisfied if the search usage logs are updated on a daily basis. For the system health user, however, the most current data is always desirable. As a result, after the usage logs for a day are gathered and ready for processing, a two tiered strategy can be used for forming a new common fact table. A first common fact table can be processed from a usage log that focuses only on the measures and dimensions requested by the system health team. This smaller common fact table can be generated more quickly, and allows the system health user (or team) to have access to the new search usage logs earlier than the other users. During the time period after this first (smaller) common fact table exists, the other users can still access their already generated auxiliary data structures based on the prior day's usage logs, but the other users will not have access to data for the new usage logs.

After completing the first common fact table with a reduced number of measures and/or dimensions, a second common fact table can be generated from the usage logs in order to include all of the measures and dimensions requested by the various users. When the second common fact table is completed, the first smaller common fact table is removed from service, so that all auxiliary data structures are formed from the second common fact table. In still other embodiments, additional intermediate tiers of processing could be used to create successively larger common fact tables.

Additional Examples

Having briefly described an overview of various embodiments of the invention, an exemplary operating environment suitable for performing the invention is now described. Referring to the drawings in general, and initially to FIG. 3 in particular, an exemplary operating environment for implementing embodiments of the present invention is shown and designated generally as computing device 300. Computing device 300 is but one example of a suitable computing environment and is not intended to suggest any limitation as to the scope of use or functionality of the invention. Neither should the computing device 300 be interpreted as having any dependency or requirement relating to any one or combination of components illustrated. A computing device 300 shown in FIG. 3 can correspond to a computing device for allowing a user to access an auxiliary data structure formed from a common fact table. A computing device 300 could also be used for processing usage logs to form a common fact table and/or form auxiliary data structures. A computing device 300 could also be used as part of a distributed network of computing devices.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, and the like. The invention may also be practiced in distributed computing environments where tasks are performed by remote-processing devices that are linked through a communications network.

Figure 3:
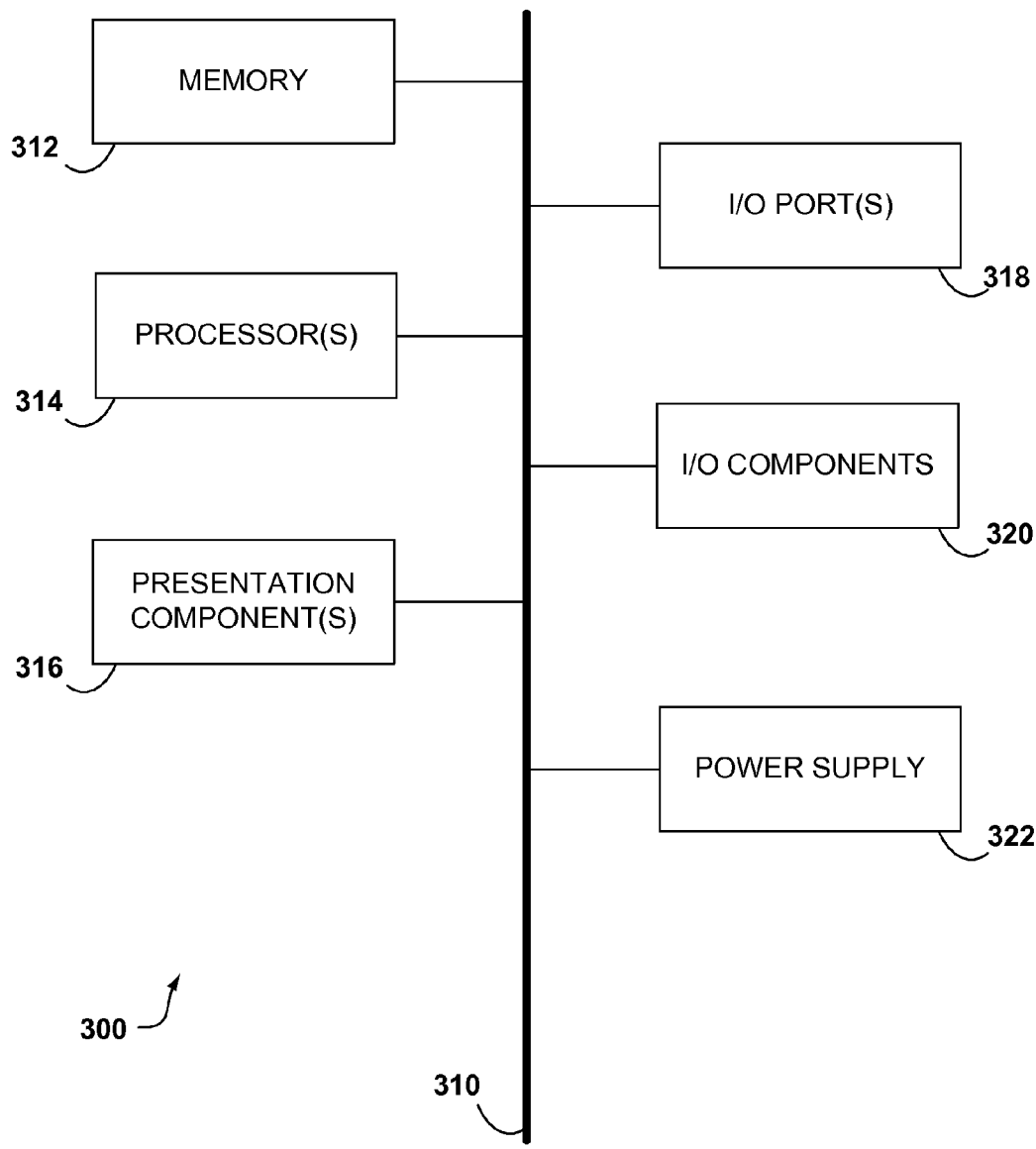
FIG. 3 is a block diagram of an exemplary computing environment suitable for use in implementing embodiments of the present invention.

With continued reference to FIG. 3, computing device 300 includes a bus 310 that directly or indirectly couples the following devices: memory 312, one or more processors 314, one or more presentation components 316, input/output (I/O) ports 318, I/O components 320, and an illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 3 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. Computer-readable media can be any available media that can be accessed by computing device 300 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that is not a "signal per se", that can be used to encode desired information, and that can be accessed by the computing device 300. In an embodiment, the computer storage media can be selected from tangible computer storage media.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 312 can include computer-storage media in the form of volatile and/or nonvolatile memory. The memory may be removable, non-removable, or a combination thereof. Exemplary hardware devices include solid-state memory, hard drives, optical-disc drives, etc. The computing device 300 includes one or more processors that read data from various entities such as the memory 312 or the I/O components 320. The presentation component(s) 316 present data indications to a user or other device. Exemplary presentation components include a display device, speaker, printing component, vibrating component, and the like.

The I/O ports 318 can allow the computing device 300 to be logically coupled to other devices including the I/O components 320, some of which may be built in. Illustrative components can include a microphone, joystick, game pad, satellite dish, scanner, printer, wireless device, etc.

Figure 4:
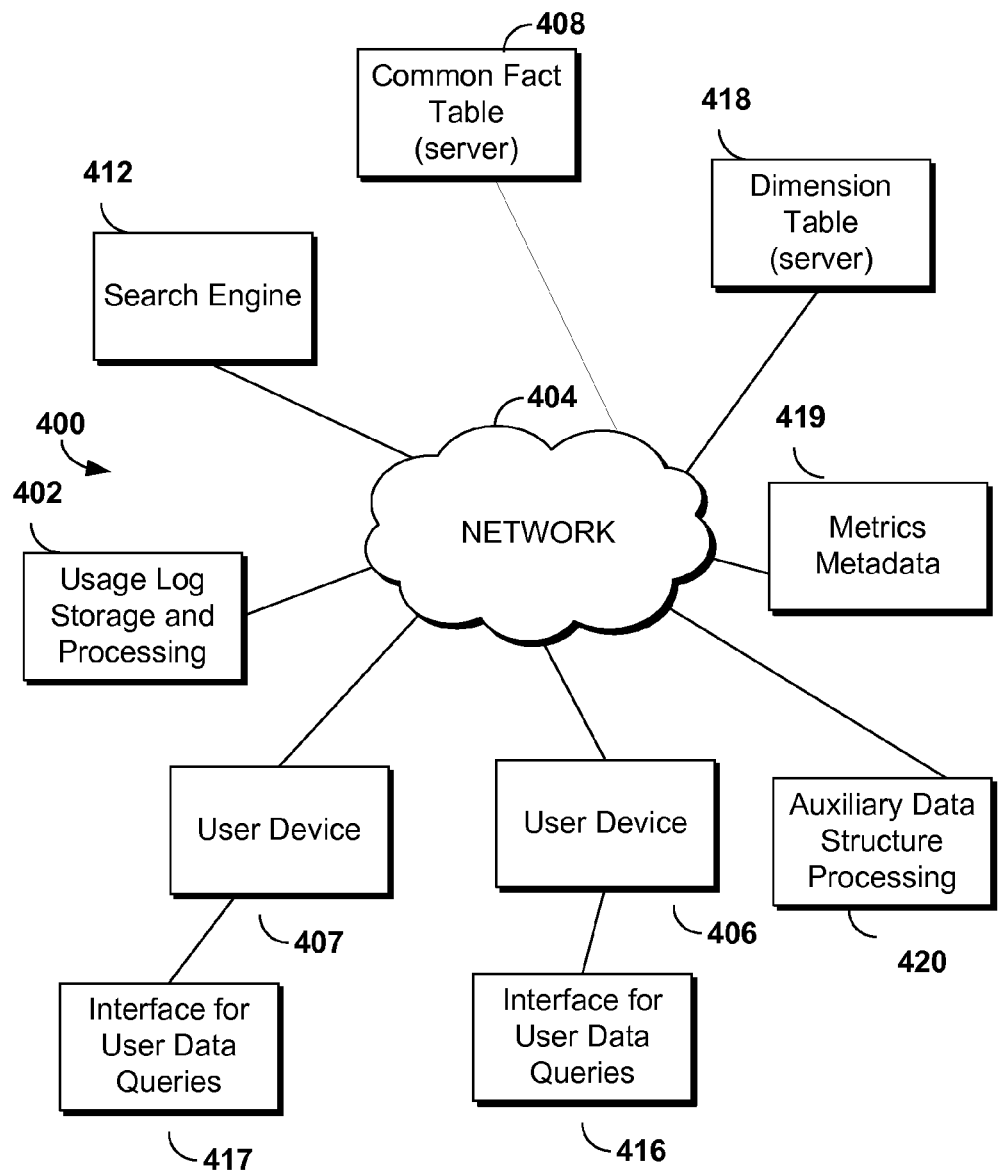
FIG. 4 schematically shows a network environment suitable for performing embodiments of the invention.

With additional reference to FIG. 4, a block diagram depicting an exemplary network environment 400 suitable for use in embodiments of the invention is described. The environment 400 is but one example of an environment that can be used in embodiments of the invention and may include any number of components in a wide variety of configurations. The description of the environment 400 provided herein is for illustrative purposes and is not intended to limit configurations of environments in which embodiments of the invention can be implemented.

The environment 400 includes a network 404, usage log storage and processing 402, user devices 406 and 407, interfaces for user data queries 416 and 417, a server for storing and/or managing a common fact table 408, one or more servers for storing and/or managing dimension tables, such as dimension table server 418, a metrics metadata database or storage structure 419, and an auxiliary data structure processing component 420. Additional component may also be included, depending on the type of usage log being processed. For example, FIG. 4 includes an example of an optional search engine 412 that could be used to generate usage logs for processing 402 in an embodiment where the usage logs are search activity logs.

The network 404 includes any computer network such as, for example and not limitation, the Internet, an intranet, private and public local networks, and wireless data or telephone networks. Preferably, at least a portion of network 404 corresponds to a network suitable for supporting a distributed computing environment. For example, a portion of network 404 for providing connectivity between common fact table server 408, dimension tables 418, metrics metadata 419, and auxiliary data structure processing component 420 can be a network for a distributed computing environment. This can facilitate storing and/or serving the common fact table 408 using a server that is different from the server(s) for dimension tables 418. The common fact table can be a different logical server or a different physical server, depending on the embodiment. Preferably, the storage associated with the server for common fact table 408 is also different from the storage for dimension tables 418.

User devices 406 and 407 can be any computing device, such as the computing device 300, which are capable of providing an appropriate interface 416 or 417 for submitting user data queries that are to be processed against auxiliary data structures. For example, the user device 406 might be a personal computer, a laptop, or a server computer, among others. The optional search engine 412 includes any computing device, such as the computing device 300, and provides functionalities for a content-based search engine.

In an embodiment having a configuration similar to FIG. 4, the optional search engine 412 can generate usage logs based on user search activity that are stored in usage log storage processing 402. The usage log storage and processing 402 then can use definitions of measures and dimensions to construct a common fact table 408 and one or more dimension tables, such as dimension tables stored in association with dimension table server(s) 418. The common fact table 408 and dimension tables 418 can then be used by auxiliary data structure processing component 420 to form auxiliary data tables based on definitions from metrics metadata database 419. Users can then use a user interface, such as user interface 416 or 417, to submit user data queries to analyze the data in an auxiliary data structure. When a user data query is received, the metrics metadata database or storage structure 419 can be accessed to identify an auxiliary data structure that contains a combination of measure and dimension in the user data query.

Figure 5:
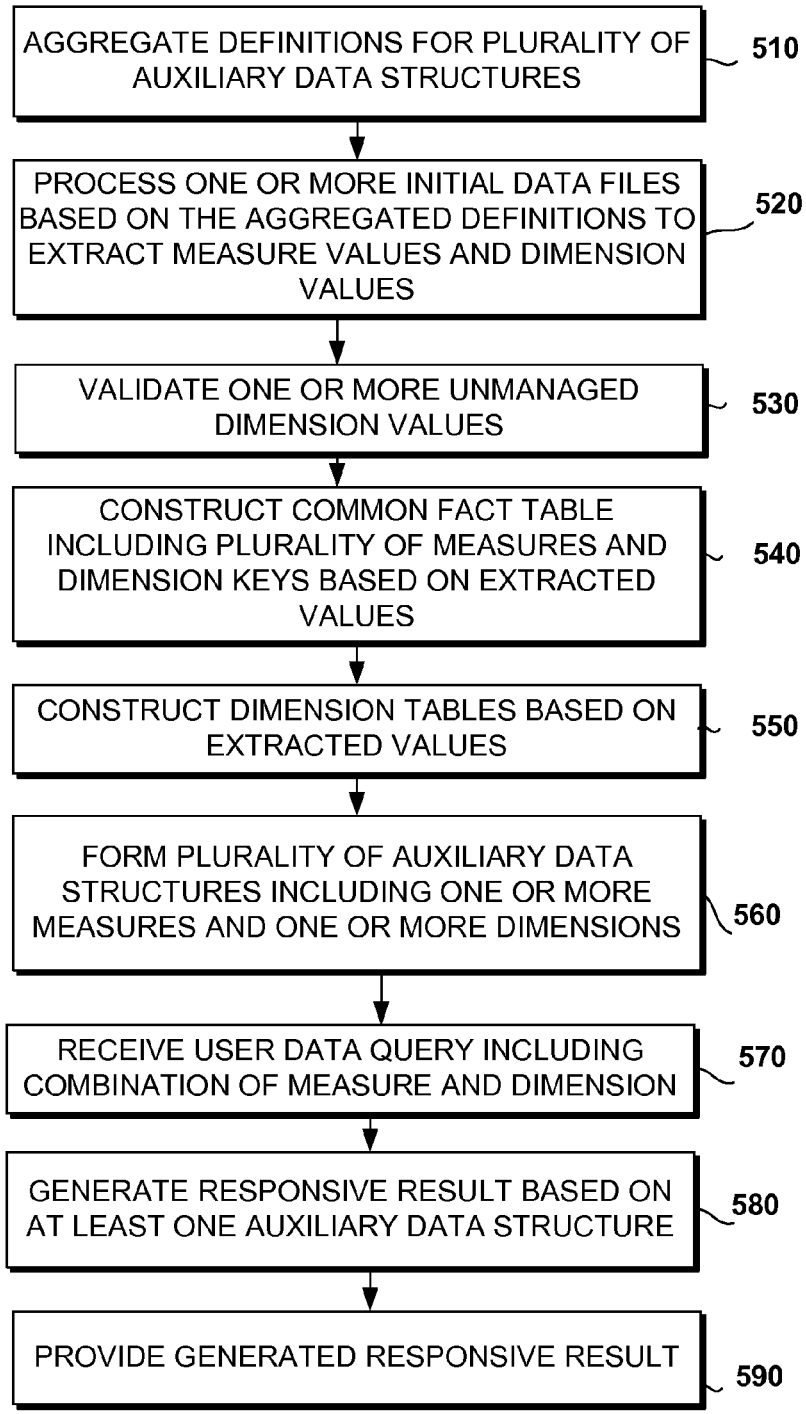
FIGS. 5-6 show examples of various methods enabled by using a common fact table and auxiliary data structures.

FIG. 5 shows an example of a method for performing data mining. In FIG. 5, a plurality of definitions for auxiliary data structures are aggregated 510. The definitions include a plurality of measures and one or more dimensions, such as a plurality of dimensions. Preferably, the definition of each dimension is associated with at least one measure from the plurality of measures. One or more initial data files are processed 520 based on the aggregated definitions to extract measure values and dimension values. In the embodiment shown in FIG. 5, one or more of the extracted dimension values for at least one dimension correspond to unmanaged dimension values. These unmanaged dimension values are validated 530 based on one or more validation rules. A common fact table is then constructed 540 that includes the plurality of measures and dimension keys for the one or more dimensions. The common fact table is constructed based on the extracted values from the one or more initial data files. One or more dimension tables are also constructed 550. The dimension tables correspond to the one or more dimensions. Preferably, the dimension tables are stored separately from the common fact table. A plurality of auxiliary data structures are then formed 560. Each auxiliary data structure includes one or more measures and one or more dimensions. A user data query is then received 570 that includes one or more measures and one or more dimensions. A responsive result is generated 580 based on at least one of the auxiliary data structures. The generated responsive result is then provided 590 to a user.

Figure 6:
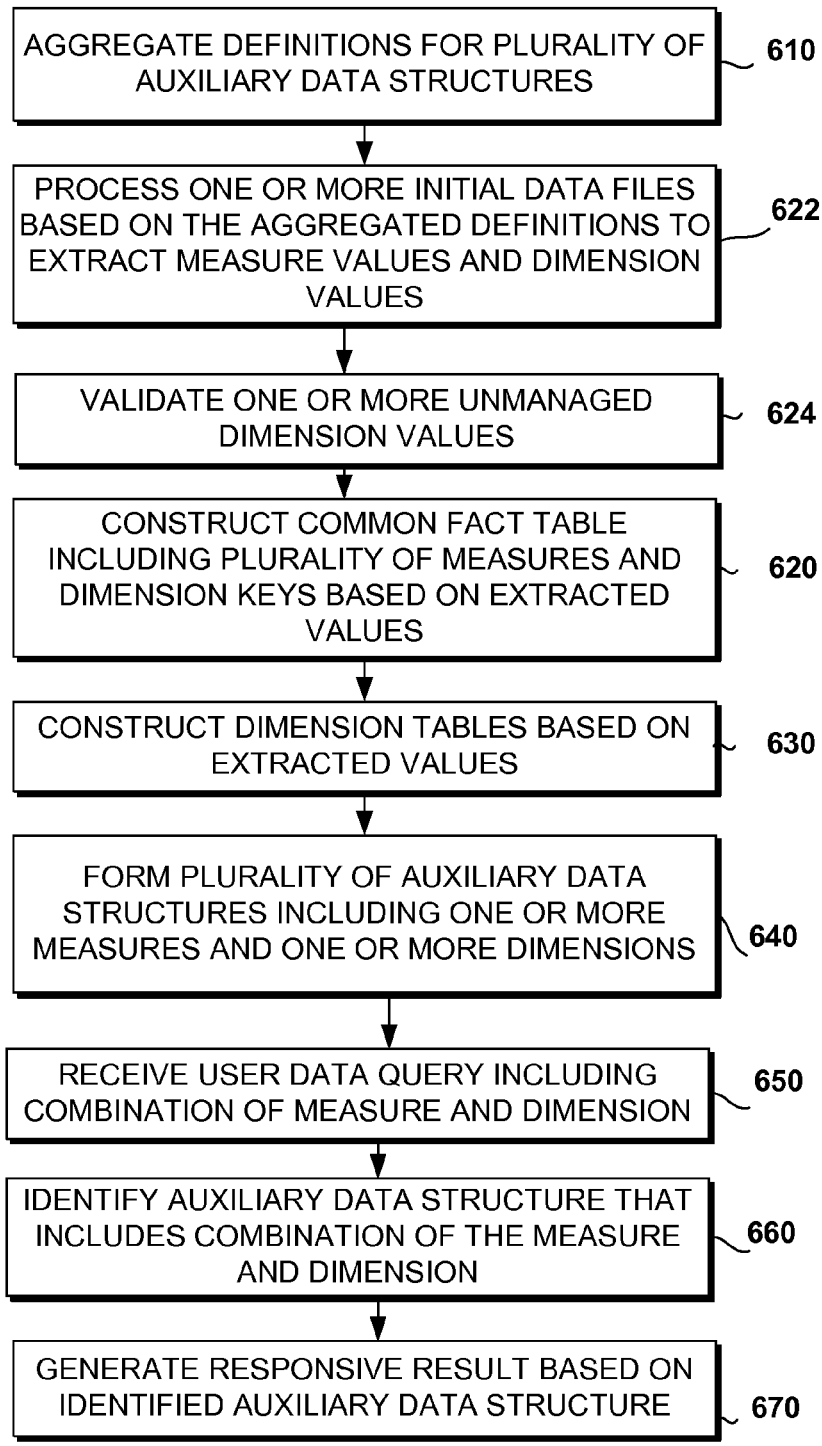

FIG. 6 shows another example of a method for performing data mining. In FIG. 6, a plurality of definitions for auxiliary data structures are aggregated 610. The definitions include a plurality of measures and one or more dimensions, such as a plurality of dimensions. Preferably, the definition of each dimension is associated with at least one measure from the plurality of measures. A common fact table is then constructed 620 that includes the plurality of measures and dimension keys for the one or more dimensions. The common fact table is constructed based on using the aggregated definitions to process one or more initial data files. For example, one or more initial data files can be processed 622 based on the aggregated definitions to extract measure values and dimension values. Optionally, one or more of the extracted dimension values for at least one dimension can correspond to unmanaged dimension values. If there are unmanaged dimensions, these unmanaged dimension values can be validated 624 based on one or more validation rules. One or more dimension tables are also constructed 630. The dimension tables correspond to the one or more dimensions. Preferably, the dimension tables are stored separately from the common fact table. A plurality of auxiliary data structures are then formed 640. Each auxiliary data structure includes one or more measures and one or more dimensions. Preferably, the auxiliary data structures can be associated with users, such as associating a first subset of the auxiliary data structures with a first user. Such an association can be based on, for example, the users that requested a particular auxiliary data structure. A user data query is then received 650 from the first user that comprises a combination of a measure and a dimension. In an option where a first subset of auxiliary data structures are associated with a first user, the combination of a measure and a dimension corresponds to a combination not found in the first subset of auxiliary data structures. To handle the request, an auxiliary data structure is identified 660 that includes the requested combination. This identification can be made, for example, based on metadata used in creating the auxiliary data structures from the common fact table. A responsive result is generated 670 based on at least the identified auxiliary data structure. This generated responsive result can be provided to the first user.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

In an embodiment, one or more computer-storage media storing computer-useable instructions are provided that, when executed by a computing device, perform a method for mining data. The method includes aggregating a plurality of definitions for auxiliary data structures, the definitions including a plurality of measures and one or more dimensions, the definition of each dimension being associated with at least one measure from the plurality of measures; constructing a common fact table including the plurality of measures and dimension keys for the one or more dimensions, the common fact table being constructed based on using the aggregated definitions of the plurality of auxiliary data structures to process one or more initial data files; constructing one or more dimension tables corresponding to the one or more dimensions, the one or more dimension tables being stored separately from the common fact table; forming a plurality of auxiliary data structures, each auxiliary data structure including one or more measures and one or more dimensions, a first user being associated with a first subset of the auxiliary data structures; receiving a user data query from the first user, the user data query comprising a combination of a measure and a dimension; identifying an auxiliary data structure from the plurality of auxiliary data structures that includes the combination of the measure and the dimension, the identified auxiliary data structure being different from the first subset of auxiliary data structures; generating a responsive result to the user data query based on the identified auxiliary data structure; and providing the generated responsive result to the first user.

In another embodiment, a computer-implemented method for mining data is provided. The method includes aggregating a plurality of definitions for auxiliary data structures, the definitions including a plurality of measures and a plurality of dimensions, the definitions comprising a plurality of managed dimension values for at least one dimension; processing one or more initial data files based on the aggregated definitions to extract values for the plurality of measures and the plurality of dimensions, the extracted values including one or more unmanaged dimension values for the at least one dimension; validating the one or more unmanaged dimension values; constructing a common fact table including the plurality of measures and dimension keys for the one or more dimensions, the common fact table being constructed based on the extracted values; constructing one or more dimension tables corresponding to the plurality of dimensions based on the extracted values, the one or more dimension tables being stored separately from the common fact table; forming a plurality of auxiliary data structures, each auxiliary data structure including one or more measures and one or more dimensions, at least one auxiliary dimension table including a dimension having validated unmanaged dimension values; receiving a user data query, the user data query comprising one or more combinations of measures and dimensions; generating a responsive result to the user data query based on at least one of the plurality of auxiliary data structures; and providing the generated responsive result.

In still another embodiment, a computer-implemented method for mining data is provided. The method includes aggregating a plurality of definitions for auxiliary data structures, the definitions including a plurality of measures and a plurality of dimensions, the definitions comprising a plurality of managed dimension values for at least one dimension, the definition of each dimension being associated with at least one measure from the plurality of measures; processing one or more initial data files based on the aggregated definitions to extract values for the plurality of measures and the plurality of dimensions, the extracted values including one or more unmanaged dimension values for the at least one dimension; validating the one or more unmanaged dimension values; constructing a common fact table including the plurality of measures and dimension keys for the plurality of dimensions, the common fact table being constructed based on the extracted values; constructing one or more dimension tables corresponding to the plurality of dimensions based on the extracted values, the one or more dimension tables being stored separately from the common fact table; forming a plurality of auxiliary data structures, each auxiliary data structure including one or more measures and one or more dimensions, at least one auxiliary dimension table including a dimension having validated unmanaged dimension values, a first user being associated with a first subset of the auxiliary data structures; receiving a user data query from the first user, the user data query including a combination of a measure and a dimension; identifying an auxiliary data structure from the plurality of auxiliary data structures that includes the combination of the measure and the dimension, the identified auxiliary data structure being different from the first subset of auxiliary data structures; and generating a responsive result to the user data query based on the identified auxiliary data structure.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. One or more computer-storage media storing computer-useable instructions that, when executed by a computing device, mine data, the instructions causing the computing device to:
   identify definitions defining which measures and dimensions are desired for inclusion in a plurality of auxiliary data structures, an auxiliary data structure representing groupings of measures and dimensions of interest from a common fact table;
   aggregate the definitions for the auxiliary data structures in a centralized data location, the definition of each dimension being associated with at least one of the measures;
   process one or more initial data files to extract measure values of the measures and dimension keys of the dimensions using the aggregated definitions;
   construct the common fact table from the extracted measure values and the extracted dimension keys from the processed one or more initial data files;

construct one or more dimension tables corresponding to the one or more dimensions, the one or more dimension tables being stored separately from the common fact table;

create the auxiliary data structures from the common fact table, each auxiliary data structure comprising the identified definitions desired for inclusion in the auxiliary data structure, each auxiliary data structure including a different subset of the measures and the dimensions of the common fact table, a first user being associated with a first subset of the auxiliary data structures;

receive a user data query from the first user, the user data query comprising a combination of a measure and a dimension;

identify an auxiliary data structure from the auxiliary data structures that includes the combination of the measure and the dimension, the identified auxiliary data structure being different from the first subset of auxiliary data structures;

generate a responsive result to the user data query based on the identified auxiliary data structure; and provide the generated responsive result to the first user.

2. The computer-storage media of claim 1, wherein at least one dimension of a first auxiliary data structure of the auxiliary data structures is different from each dimension of a second auxiliary data structure of the auxiliary data structures.

3. The computer-storage media of claim 1, wherein at least one measure of a first auxiliary data structure of the auxiliary data structures is different from each measure of a second auxiliary data structure of the auxiliary data structures.

4. The computer-storage media of claim 1, wherein each measure of a first auxiliary data structure of the auxiliary data structures is different from each measure of a second auxiliary data structure of the auxiliary data structures.

5. The computer-storage media of claim 1, wherein identifying the auxiliary data structure comprising identifying the auxiliary data structure based on a listing of auxiliary data structures generated from the common fact table.

6. The computer-storage media of claim 1, wherein a plurality of the aggregated definitions comprise user-defined definitions.

7. The computer-storage media of claim 6, wherein the auxiliary data structure formed from the common fact table comprises a measure from a first user-defined definition and a dimension from a second user-defined definition, the dimension from the second user-defined definition being different from the dimensions in the first user-defined definition.

8. The computer-storage media of claim 1, wherein the aggregated definitions comprise one or more definitions that are associated with the first user, at least one of the measure and the dimension in the user data query being different from measures and dimensions in the one or more definitions associated with the first user.

9. The computer-storage media of claim 8, wherein the one or more definitions are associated with the first user based on the first user being a member of a group of users associated with the one or more definitions.

10. The computer-storage media of claim 1, wherein providing a first generated responsive result comprises displaying at least a portion of the first responsive result to the first user.

11. The computer-storage media of claim 1, wherein the aggregated definitions comprise one or more definitions that are associated with the first user, at least one of the measure and the dimension in the user data query being different from measures and dimensions in the one or more definitions associated with the first user.

12. A computer-implemented method for mining data, comprising:

identifying definitions defining which measures and dimensions are desired for inclusion in auxiliary data structures, an auxiliary data structure representing groupings of measures and dimensions of interest from a common fact table;

aggregating the definitions for the auxiliary data structures, the definitions comprising a plurality of managed dimension values for at least one dimension;

processing one or more initial data files to extract values for the measures and the dimensions using the aggregated definitions, the extracted values including one or more unmanaged dimension values for the at least one dimension;

validating the one or more unmanaged dimension values;

constructing the common fact table from the extracted values of the measures and dimension keys of the dimensions from the processed one or more initial data files;

constructing one or more dimension tables corresponding to the plurality of dimensions based on the extracted values, the one or more dimension tables being stored separately from the common fact table;

creating the auxiliary data structures from the common fact table, each auxiliary data structure including a different subset of the measures and the dimensions of the common fact table, the subset of the measures and the dimensions of the common fact table corresponding to the measures and dimensions of interest of the auxiliary data structure, at least one auxiliary dimension table including a dimension having validated unmanaged dimension values;

receiving a user data query, the user data query comprising one or more combinations of measures and dimensions;

generating a responsive result to the user data query based on at least one of the auxiliary data structures; and providing the generated responsive result.

13. The method of claim 12, wherein the generated responsive result comprises a dimension having validated unmanaged dimension values.

14. The method of claim 12, wherein the one or more unmanaged dimension values are validated based on a number of instances of each unmanaged dimension value being less than a first threshold value.

15. The method of claim 12, wherein the one or more unmanaged dimension values are validated based on the one or more unmanaged dimension values being less than a second threshold value.

16. The method of claim 12, wherein the one or more unmanaged dimension values are validated based on a plurality of combinations of first threshold values for a number of instances of a dimension value and second threshold values for a number of unmanaged dimension values.

17. The method of claim 12, wherein validating the one or more unmanaged dimension values comprises matching a format of an unmanaged dimension value to a format validation rule.

18. The method of claim 12, wherein the user data query is received from a first user, the aggregated definitions comprising one or more definitions that are associated with the first user, and at least one of the measures and the dimensions in the user data query are different from measures and dimensions in the one or more definitions associated with the first user.

19. The method of claim 12, wherein at least one of the auxiliary data structures formed from the common fact table comprises a measure from a first user-defined definition and a dimension from a second user-defined definition, the dimension from the second user-defined definition being different from the dimensions in the first user-defined definition.

20. A computer-implemented method for mining data, comprising:
    identifying definitions defining which measures and dimensions are desired for inclusion in auxiliary data structures, an auxiliary data structure representing groupings of measures and dimensions of interest from a common fact table;
    aggregating the definitions for the auxiliary data structures, the definitions comprising a plurality of managed dimension values for at least one dimension, the definition of each dimension being associated with at least one measure from the plurality of measures;
    processing one or more initial data files to extract values for the measures and the dimensions using the aggregated definitions, the extracted values including one or more unmanaged dimension values for the at least one dimension, each of the unmanaged dimension values being an unexpected value extracted in the processing, and each of the managed dimension values being a pre-identified value extracted in the processing;
    validating the one or more unmanaged dimension values as being proper values for the at least one dimension;
    constructing the common fact table from the extracted values of the measures and dimension keys of the dimensions from the processed one or more initial data files;
    constructing one or more dimension tables corresponding to the plurality of dimensions based on the extracted values, the one or more dimension tables being stored separately from the common fact table;
    creating the auxiliary data structures from the common fact table, each auxiliary data structure including a different subset of the extracted values of the measures from the common fact table and the dimensions, the different subset of the extracted values of the measures from the common fact table and the dimensions corresponding to the measures and dimensions of interest of the auxiliary data structure, at least one auxiliary dimension table including a dimension having validated unmanaged dimension values, a first user being associated with a first subset of the auxiliary data structures;
    receiving a user data query from the first user, the user data query including a combination of a measure and a dimension;
    identifying an auxiliary data structure from the auxiliary data structures that includes the combination of the measure and the dimension, the identified auxiliary data structure being different from the first subset of the auxiliary data structures; and
    generating a responsive result to the user data query based on the identified auxiliary data structure.

21. A system for mining data, comprising:
    a processing script configured to control processing of initial data files using aggregated definitions of auxiliary data structures to construct a common fact table, an auxiliary data structure representing a subset of measures and dimensions of interest from the common fact table, the aggregated definitions defining which measures and dimensions are desired for inclusion in the auxiliary data structures, the definition of each dimension being associated with at least one measure from the plurality of measures, the common fact table being constructed from measure values of the measures and dimension keys for the dimensions based on the measures and the dimensions being defined as desired for inclusion in the auxiliary data structures in the aggregated definitions using the processing script;
    one or more dimension tables corresponding to the one or more dimensions, the one or more dimension tables stored separately from the common fact table;
    the auxiliary data structures constructed from the common fact table, each auxiliary data structure including a different subset of the measures and the dimensions of the common fact table, the different subset of the measures and the dimensions of the common fact table corresponding to the measures and dimensions of interest of the auxiliary data structure, a first user being associated with a first subset of the auxiliary data structures;
    a data query processing component configured to:
    receive a user data query from the first user, the user data query comprising a combination of a measure and a dimension;
    identify an auxiliary data structure from the auxiliary data structures that includes the combination of the measure and the dimension, the identified auxiliary data structure being different from the first subset of auxiliary data structures;
    generate a responsive result to the user data query based on the identified auxiliary data structure; and
    provide the generated responsive result to the first user.

22. The system of claim 21, wherein the dimension keys of the common fact table comprise references to where to access corresponding ones of the dimensions in the one or more dimension tables.

23. The system of claim 21, wherein at least one dimension of a first auxiliary data structure of the auxiliary data structures is different from each dimension of a second auxiliary data structure of the auxiliary data structures.

24. The system of claim 21, wherein at least one measure of a first auxiliary data structure of the auxiliary data structures is different from each measure of a second auxiliary data structure of the auxiliary data structures.

25. The system of claim 21, comprising a first server configured to store the common fact table and a second server configured to store the one or more dimension tables.

26. The system of claim 21, wherein the identified auxiliary data structure is associated with a second user.

* * * * *